United States Patent Office 3,054,789
Patented Sept. 18, 1962

3,054,789
PROCESS FOR THE PREPARATION OF PURE
SUCROSE ESTERS
Vitangelo D'Amato, Milan, Italy, assignor to
Ledoga S.p.A., Milan, Italy
No Drawing. Filed Mar. 13, 1959, Ser. No. 799,100
Claims priority, application Italy Feb. 6, 1959
6 Claims. (Cl. 260—234)

This invention is concerned with the preparation of pure sucrose fatty acid esters.

More particularly, the invention is concerned with a general process of production of highly pure sucrose esters of long chain fatty acids, either saturated or unsaturated, having from 6 to 30 carbon atoms.

The preparation of sucrose esters of long chain fatty acids has already been described. Said esters are useful as emulsifying agents and detergents. Owing to their low toxicity, their use has been recommended also in cosmetic, pharmaceutical and food applications. Some of these applications require that the products be available in a high purity degree. However, the processes disclosed in literature fail to give entirely pure products, and yields are usually poor.

The known processes consist in an interesterification between a monocarboxylic fatty acid lower alkyl ester, or the corresponding natural or synthetic glycerides, and sucrose, whereby 1 mole of the appropriate ester or glyceride is reacted with 3 moles of sucrose when sucrose monoesters are desired, while for the preparation of sucrose diesters 1 mole of sucrose is preferably reacted with 3 moles of the fatty acid ester or glyceride. The interesterification is usually carried out in the presence of a small amount of a basic catalyst, such as anhydrous potassium carbonate, in an anhydrous, high boiling solvent, which is usually selected from solvents of the aromatic, aliphatic, alicyclic or heterocyclic series having at least one amide or amino group, or alternatively is a dialkylsulfoxide.

These solvents are bad smelling, poorly volatile, toxic compounds. They must be therefore carefully removed from the end compounds, particularly when these are destined for use as pharmaceutical and food additives. The elimination of the last traces of the solvents is particularly difficult in view of the known properties of fatty substances, such as fatty acid esters of sucrose, which adsorb and withhold odors and release with great difficulty the traces of solvents therein contained, particularly when the product is in form of clumps or has a high viscosity.

One object of the invention is to obtain sucrose esters of long chain fatty acids in a high degree of purity by procedures which are common in chemical technology and do not require special apparatus by a commercially advantageous process. Another object of the invention is to prepare sucrose esters of long chain fatty acids in a high yield previously unknown in this field.

The process of the invention is useful for the preparation of both mono- and diesters and their mixtures. The process applies to products deriving from the interesterification of sucrose with both lower alkyl esters and glycerides of long chain fatty acids with 6 to 30 carbon atoms.

According to the process of the invention, the reaction mixture resulting from interesterification of the long chain fatty acid lower alkyl ester or glyceride and sucrose in an anhydrous solvent in the presence of a small amount of a basic catalyst after removal of the catalyst by filtration, is made neutral by the addition of a lower aliphatic carboxylic acid. The resulting mixture is then extracted, in a continuous extraction apparatus, with an organic solvent not miscible with the solvent used for the interesterification, but capable of dissolving the unreacted fatty acid lower alkyl ester or glyceride and the free fatty acid present in the medium, and in which the fatty acid sucrose ester is insoluble, and having a favorable partition coefficient.

It is hereby to be noted that while this continuous extraction is necessary when sucrose diesters of long chain fatty acids are prepared, in order to remove the large amount of free fatty acids and unreacted fatty acid lower alkyl esters or glycerides present in the reaction mixture after it has been made neutral with the lower aliphatic carboxylic acid, the reaction mixture deriving from the preparation of sucrose monoesters of long chain fatty acid, if desired, can be passed to the subsequent step of the claimed procedure without subjecting it to the continuous extraction step, owing to the small amount of impurities, which do not influence the quality of the end products.

In any case, whether the continuous extraction has been carried out or not, the reaction mixture, after it has been brought to about neutral pH as above indicated, is evaporated to dryness in vacuo. The crude residue, which contains large amounts of the reaction solvent and of unreacted sucrose, is dissolved in an appropriate solvent mixture, from which toxic impurities are totally removed by several extractions with water and saline solution, as described hereinafter. We have found that the most appropriate solvent mixture consists in a mixture of mutually miscible solvents, of which the one is an aliphatic alcohol, partially soluble in water and capable of largely dissolving sucrose esters, such as e.g. n-butanol, and the other is a solvent totally insoluble in water, in which the reaction solvent is practically insoluble, such as cyclohexane and petroleum ether. In this way the residual reaction solvent, which is usually water soluble, and the excess sucrose are easily and quantitatively washed out by water and the saline solution used in the subsequent washings. Another paramount advantage of the solvent mixture used in our process is that the commonly observed formation of emulsion during the washing with water and saline solution is entirely inhibited and an easy separation of the two layers is obtained. Moreover, the solution of sucrose esters in the solvent mixture has low viscosity and can be easily decolorized with charcoal and quickly filtered. From the aqueous washings, if desired, the excess unreacted sucrose may be easily recovered.

The pure product solution in the solvent mixture is then evaporated to dryness, and the recovered solvents may be used, if desired, in subsequent runs without purification. The usually pasty residue is immediately passed through a cylinder refiner, thus effecting lamination in thin sheets and a quick cooling of the mass. The sheets are then finely powdered by an appropriate apparatus. Owing to its physical state, the powder, when dried in vacuo, quickly loses the residual traces of purification solvents.

The following examples are illustrative of the invention but are not limitative of the same. Obvious modifications of the claimed process are considered as falling within the scope of the invention.

*Example 1*

A mixture of 300 kg. of dimethylformamide and 51.300 kg. of sucrose is heated to 70–75° C. till the solution is complete, then 81 kg. of methyl palmitate and 2 kg. of finely ground anhydrous potassium carbonate are added. The solution is slowly distilled in vacuo (90/100 mm.) gradually heating to 90–95° C. for about 10–12 hours. During this period 20 l. of a mixture of dimethylformamide and methanol are distilled.

When reaction is complete, the mixture is cooled and the undissolved potassium carbonate is separated by filtration. The filtrate is adjusted to pH 5.4 with acetic acid and the solution of the product in dimethylformamide is transferred to an extraction column or to another appropriate apparatus. The solution is then extracted with petroleum ether till a sample of 100 ml. of the ether solution, evaporated to dryness and titrated with NaOH N/10, gives a content of palmitic acid of about 0.004 percent.

After separation of the supernatant ether extract the solution in dimethylformamide is distilled at first under ordinary pressure to remove the petroleum ether still present in traces and then in vacuo. The residual mass is passed through a three cylinders refiner and broken to small sheets, which are dissolved at 45–50° C. in 117 kg. of n-butanol and 117 kg. of cyclohexane. After the solution is complete, a first washing is carried out by adding 110 l. of water recovered from the fifth washing of the preceding run. After 3 hours at 45–50° C. under stirring the mass is allowed to stand and the lower layer is discharged. From this layer sucrose may be recovered if desired. Washing is repeated at the same temperature, time and quantity conditions with a 20% water solution of sodium chloride coming from the third washing of the preceding run. The water layer is discarded. A third washing is then carried out with a 20% NaCl solution coming from the fourth washing of the preseding run; the water layer is separated and again used for the second washing. A fourth washing is then carried out under the same conditions using a fresh 20% saline solution.

Two additional washings with pure water are then performed to eliminate the chloride traces present in the main solution. Of these washings, the former is used to carry out the first washing of the subsequent run while the latter is discarded.

After all these washings, to the main solution 1 kg. of charcoal and 1 kg. of decolourizing earth are added, the mixture is stirred at 50° C. for 1 hour and filtered through a closed pre-heated filter.

The filtrate is distilled at ordinary pressure, then in vacuo to dryness.

From the apparatus the pure product is discharged as a melted mass which is passed through a refiner as indicated above. The laminated product is ground as finely as possible and dried in vacuo at 45° for 8–10 hours until it becomes odorless.

Yield of sucrose dipalmitate 91 kg. (75%). The product contains less than 50 p.p.m. of dimethylformamide.

*Example 2*

A mixture of 317 kg. of dimethylformamide and 90.400 kg. of sucrose is heated to 90–95° C. Once the solution is complete, 26.300 kg. of methyl stearate and 0.9 kg. of finely ground anhydrous potassium carbonate are added. The interesterification is carried out in vacuo at the highest internal temperature of 90–95° C. slowly distilling off dimethylformamide and methanol. At the end of the reaction, i.e. after 10–12 hours, the mass is cooled to 50° C. and made neutral to pH 5.4–5.5 with propionic acid and evaporated to dryness in vacuo. The pasty mass is passed through a cylinder refiner then it is dissolved in twice its weight of a 1:1 mixture of n-butanol and cyclohexane at 45–50° C. To effect purification two washings are carried out with 100 l. of pure water each time under vigorous stirring during 2 hours at 45–50°. After separation of the layers, the sucrose solution is discharged and used for the recovery of sucrose, while the supernatant cyclohexane-butanol solution is washed twice with 20% saline solution under the same conditions as indicated above for the two first washings with water and finally with pure water. The main solution after having been decolourized with charcoal and fuller's earth, is filtered, distilled and worked up as indicated in Example 1.

Yield of sucrose monostearate 41 kg. (78% on methyl stearate). The dimethylformamide content of the product is lower than 50 p.p.m.

I claim:
1. In a process for preparing pure sucrose long chain fatty acid esters by interesterification of sucrose and an ester of the class consisting of monocarboxylic fatty acid lower alkyl esters and glycerides in a solvent in the presence of a basic catalyst followed by addition of a lower aliphatic carboxylic acid to the reaction mixture at the end of interesterification to neutralize said mixture the steps comprising extracting from the reaction mixture the unreacted fatty acid ester and the free fatty acid with petroleum ether, and after evaporation to dryness of the residual reaction mixture, dissolving the dry residue in about 1:1 mixture of cyclohexane and n-butanol, washing the extract with water, separating the water extract and evaporating to dryness the cyclohexane-n-butanol solution to yield the separated sucrose ester product.

2. Process according to claim 1, wherein the cyclohexane and n-butanol are added at a temperature of 45–50° C., and wherein the evaporations are conducted with the aid of vacuum.

3. In a process for preparing sucrose long chain fatty acid esters substantially free from dimethylformamide by interesterification of sucrose and an ester of the class consisting of monocarboxylic fatty acid lower alkyl esters and glycerides in dimethylformamide in the presence of a basic catalyst followed by addition of a lower aliphatic carboxylic acid to the reaction mixture at the end of interesterification to neutralize said mixture, the steps comprising extracting the reaction mixture with an organic solvent for the unreacted fatty acid ester and the free fatty acid which is not miscible with dimethyl formamide, and after evaporation to dryness of the residual reaction mixture, dissolving the dry residue in about 1:1 mixture of cyclohexane and n-butanol, washing the extract with water, separating the water extract, and evaporating to dryness the cyclohexane-n-butanol solution to yield the separated sucrose ester product.

4. Process according to claim 3, wherein the cyclohexane and n-butanol are added at a temperature of 45–50° C., and wherein the evaporations are conducted with the aid of vacuum.

5. In a process for preparing pure sucrose long chain fatty acid esters by interesterification of sucrose and an ester of the class consisting of monocarboxylic fatty acid lower alkyl esters and glycerides in dimethylformamide and in the presence of a basic catalyst followed by neutralization of the reaction mixture at the end of interesterfication, the steps comprising extracting from the reaction mixture the unreacted fatty acid ester and the free fatty acid with a volatile solvent for fats which is not miscible with dimethylformamide, and after evaporation to dryness of the residual reaction mixture, dissolving the dry residue in an about 1:1 mixture of cyclohexane and n-butanol, washing the extract with water, separating the water extract, and evaporating to dryness the cyclohexane-n-butanol solution to yield the sucrose ester product.

6. Process according to claim 5, wherein the cyclohexane and n-butanol are added at a temperature of 45–50° C., and wherein the evaporations are conducted with the aid of vacuum.

References Cited in the file of this patent

UNITED STATES PATENTS

| | | |
|---|---|---|
| 2,831,854 | Tucker et al. | Apr. 22, 1958 |
| 2,893,990 | Hass et al. | July 7, 1959 |